US012069004B2

(12) United States Patent
Laselva et al.

(10) Patent No.: US 12,069,004 B2
(45) Date of Patent: Aug. 20, 2024

(54) PRECONFIGURED RADIO LINK SWITCHING FOR BANDWIDTH PARTS

(71) Applicant: NOKIA TECHNOLOGIES OY, Espoo (FI)

(72) Inventors: Daniela Laselva, Klarup (DK); Marco Centenaro, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 285 days.

(21) Appl. No.: 17/439,701

(22) PCT Filed: Mar. 28, 2019

(86) PCT No.: PCT/EP2019/057888
§ 371 (c)(1),
(2) Date: Sep. 15, 2021

(87) PCT Pub. No.: WO2020/192928
PCT Pub. Date: Oct. 1, 2020

(65) Prior Publication Data
US 2022/0166595 A1  May 26, 2022

(51) Int. Cl.
*H04L 5/00* (2006.01)
*H04W 36/06* (2009.01)
*H04W 72/0453* (2023.01)

(52) U.S. Cl.
CPC .......... *H04L 5/0098* (2013.01); *H04L 5/0005* (2013.01); *H04L 5/0044* (2013.01); *H04W 36/06* (2013.01); *H04W 72/0453* (2013.01)

(58) Field of Classification Search
CPC .............. H04W 72/0453; H04W 36/06; H04L 5/0044; H04L 5/0005; H04L 5/0098
See application file for complete search history.

(56) References Cited

U.S. PATENT DOCUMENTS

| 6,629,285 B1 * | 9/2003 | Gerendai | ................ | H04L 1/188 |
| | | | | 714/748 |
| 2003/0086415 A1 * | 5/2003 | Bernhard | ................ | H04L 1/188 |
| | | | | 370/352 |

(Continued)

FOREIGN PATENT DOCUMENTS

| CN | 103609186 A | 2/2014 |
| CN | 107078968 A | 8/2017 |

(Continued)

OTHER PUBLICATIONS

Communication pursuant to Article 94(3) EPC dated Jan. 27, 2023, corresponding to European Patent Application No. 19714626.9.

(Continued)

*Primary Examiner* — James P Duffy
(74) *Attorney, Agent, or Firm* — Robert P. Michal, Esq.; Carter, DeLuca & Farrell LLP

(57) ABSTRACT

It is provided a method, comprising instructing a sender to transmit a first packet data unit to a receiver on a first active bandwidth part of a carrier at a first transmission time; determining a delay and a second bandwidth part of the carrier based on a switching rule; wherein the switching rule defines that the second bandwidth part is different from the first bandwidth part; and the method further comprises instructing, if the sender is instructed to transmit the first packet data unit, the sender to transmit a second packet data unit to the receiver on the second active bandwidth part at a second transmission time after the delay after the instructing to transmit the first packet data unit has elapsed.

9 Claims, 5 Drawing Sheets

(56) References Cited

U.S. PATENT DOCUMENTS

| | | | |
|---|---|---|---|
| 2004/0001457 A1* | 1/2004 | Chitrapu | H04W 28/06 |
| | | | 455/433 |
| 2012/0218914 A1 | 8/2012 | Tanaka et al. | |
| 2020/0205050 A1* | 6/2020 | Shah | H04W 36/0069 |
| 2020/0305186 A1* | 9/2020 | Alfarhan | H04W 72/23 |

FOREIGN PATENT DOCUMENTS

| | | |
|---|---|---|
| CN | 108024347 A | 5/2018 |
| EP | 3 525 538 A1 | 8/2019 |
| WO | WO 2018/082419 A1 | 5/2018 |
| WO | WO 2020/120825 A1 | 6/2020 |
| WO | WO 2020/164719 A1 | 8/2020 |

OTHER PUBLICATIONS

International Search Report and Written Opinion dated Jan. 2, 2020 corresponding to International Patent Application No. PCT/EP2019/057888.

3GPP TS 38.211 V15.4.0 (Dec. 2018), Technical Specification, 3rd Generation Partnership Project; Technical Specification Group Radio Access Network; NR; Physical channels and modulation (Release 15), Dec. 2018.

3GPP TS 38.212 V15.3.0 (Sep. 2018), Technical Specification, 3rd Generation Partnership Project; Technical Specification Group Radio Access Network; NR; Multiplexing and channel coding (Release 15), Sep. 2018.

3GPP TS 38.213 V15.4.0 (Dec. 2018), Technical Specification, 3rd Generation Partnership Project; Technical Specification Group Radio Access Network; NR; Physical layer procedures for control (Release 15), Dec. 2018.

3GPP TS 38.300 V15.4.0 (Dec. 2018), Technical Specification, 3rd Generation Partnership Project; Technical Specification Group Radio Access Network; NR; NR and NG-RAN Overall Description; Stage 2 (Release 15), Dec. 2018.

3GPP TS 38.331 V15.4.0 (Dec. 2018), Technical Specification, 3rd Generation Partnership Project; Technical Specification Group Radio Access Network; NR; Radio Resource Control (RRC) protocol specification (Release 15), Dec. 2018.

3GPP TR 38.825 V1.0.0 (Mar. 2019), Technical Report, 3rd Generation Partnership Project; Technical Specification Group Radio Access Network; Study on NR Industrial Internet of Things (IoT); (Release 16), Mar. 2019.

Nokia Networks, "MTC UE Behavior for Simultaneous Reception of Multiple Transport Blocks," 3GPP Draft; R1-156635, 3GPP TSG-RAN WG1 Meeting #83, Anaheim, USA, Nov. 15, 2015, XP051003034.

Ericsson, "Evaluation of URLLC Factory Automation Scenario at 30 GHz," 3GPP Draft; R1-1900171, 3GPP TSG RAN WG1 Ad-Hoc Meeting 1901, Taipei, Taiwan, Jan. 21-25, 2019.

NTT Docomo, Inc., "Views and evaluations for URLLC scenarios," 3GPP Draft; R1-1900976, 3GPP TSG RAN WG1 Ad-Hoc Meeting 1901, Taipei, Taiwan, Jan. 21-25, 2019.

Nokia et al., "New WID: Support of NR Industrial Internet of Things (IoT)," 3GPP, RP-190728, 3GPP TSG RAN Meeting #83, Shenzhen, China, Mar. 18-21, 2019.

Nokia et al., "Revised SID: Study on NR Industrial Internet of Things (IoT)," 3GPP, RP-182090, 3GPP TSG RAN meeting #81, Gold Coast, Australia, Sep. 10-13, 2018.

Communication under Rule 71(3) EPC dated Jul. 6, 2023, corresponding to European Patent Application No. 19714626.9.

First Examination Report dated Mar. 30, 2022 corresponding to Indian Patent Application No. 202147048507.

"3rd Generation Partnership Project; Technical Specification Group Radio Access Network; NR; Medium Access Control (MAC) protocol specification (Release 15)", 3GPP TS 38.321, V15.4.0, Mar. 2019, pp. 1-77.

Office action received for corresponding Chinese Patent Application No. 201980094783.5, dated Feb. 29, 2024, 13 pages of office action and English translation, 12 pages, total 25 pages.

* cited by examiner

PRECONFIGURED RADIO LINK SWITCHING FOR BANDWIDTH PARTS

FIELD OF THE INVENTION

The present invention relates to preconfigured radio link switching for bandwidth parts. In a particular case, it relates to data duplication, in which it is particularly useful in the context of URLLC.

Abbreviations

3G/4G/5G $3^{rd}/4^{th}/5^{th}$ Generation
3GPP $3^{rd}$ Generation Partnership Project
ACK Acknowledgment
BLER Block Error Rate
BW Bandwidth
BWP Bandwidth Part
BWPCI Bandwidth Part Configuration Index
BWPI Bandwidth Part Indicator
CA Carrier Aggregation
CC Component Carrier
CE Control Element
CG Configured Grant
CQI Channel Quality Information
CSI Channel State Information
CSI-RS Channel State Information-Reference Signal
DC Dual Connectivity
DCI Downlink Control Information
DL Downlink
DRB Data Radio Bearer
EESM Exponential Effective SINR Mapping
eMBB Enhanced Mobile Broadband
eNB evolved NodeB (base station of 4G)
FDD Frequency Division Duplex
gNB gNodeB (base station of 5G)
HARQ Hybrid Automatic Repeat Request
HetNet Heterogeneous Network
ICIC Interchannel Interference Cancellation
IE Information Element
IIoT Industrial Internet of Things
IoT Internet of Things
LCH Logical Channel
LTE Long-term Evolution
MAC Multiple Access Channel
MC Multi-Connectivity
MCS Modulation and Coding Scheme
mMTC Massive Machine-Type Communication
MTC Machine-Type Communication
NACK negative-acknowledgement
NR New Radio
PBCCH Physical Broadcast Control Channel
PCell Primary Cell
PDCCH Physical Downlink Control Channel
PDCP Packet Data Convergence Protocol
PDSCH Physical Downlink Shared Channel
PDU Packet Data Unit
PHY Physical layer
Pkt Packet
PRB Physical Resource Block
PSCell Primary Secondary Cell
QPSK Quadrature Phase Shift Keying
RAN Radio Access Network
Rel Release
RF Radio Frequency
RLC Radio Link Control
RRC Radio Resource Control
SA System Architecture
SCell Secondary Cell
SCS Subcarrier Spacing
SDAP Service Data Adaptation Protocol
SIB System Information Block
SINR Signal to interference and noise ratio
SN Sequence Number
SPS Semi-persistent Scheduling
TB Transport Block
TR Technical Report
TRS Tracking Reference Signal
TS Technical Specification
TSN Time-Sensitive Networking
TXM Transmission
UE User Equipment
UL Uplink
UPF User Plane Function
URLLC Ultra-Reliable Low-Latency Communication
vCC Virtual Component Carrier
Xn Interface between gNBs (base stations)

BACKGROUND OF THE INVENTION

The study item 3GPP RP-182090—Study on NR Industrial Internet of Things of the Rel-16 Industrial IoT (IIoT) comprises the following objective:
"L2/L3 enhancements:
 Data duplication and multi-connectivity enhancements, including (RAN2/RAN3):
  Resource efficient PDCP duplication e.g. coordination between the nodes for PDCP duplication activation and resource efficiency insurance, avoiding unnecessary duplicate transmissions etc.
  PDCP duplication with more than 2 copies leveraging (combination of) DC and CA, whereupon data transmission takes places from at most two nodes: assessment of the gains, and if beneficial, study the associated solutions.
  Potential impacts of higher layer multi-connectivity as studied by SA2."

Further information is available in 3GPP TR 38.825 and the follow-up Rel-16 work item (RP-190728).

Thus, data duplication at PDCP layer is considered an enabler of the IIoT paradigm. Indeed, PDCP data duplication offers transmit diversity boosting, thereby lowers the error probability for the duplicated packet, as errors occurring on two transmission paths are typically uncorrelated at a certain degree. PDCP data duplication is supported in the 3GPP Release 15 either across distinct component carriers (CCs) in the same network node (i.e., when combined to carrier aggregation, CA), or across two distinct nodes (i.e., when combined to dual connectivity, DC). Moreover, in future releases multi-connectivity (MC) may be also considered. MC allows to use more than two nodes at a time and/or more than two radio links to be involved in the transmission/reception operations towards a user equipment (UE), for instance where the radio links are a combination of DC and CA.

In an intra-gNB deployment of PDCP data duplication, the two (or more) transmission paths to convey the packet duplicates are instantiated at the same gNB. The intra-gNB scenario is rather important even assuming a heterogeneous network (hetnet) deployment (entailing DC), because only a fraction of the UEs present in the network can benefit from DC due to their physical proximity to one dominant serving cell. For instance, in the hetnet scenario defined by 3GPP for performance evaluation, this realistic effect is modelled assuming that only about 30% of UEs in a macro-cell area are dropped around the small cell cluster. This results in having only up to ~30% of the UEs that can benefit from DC to both the macro and small cells, whereas the remaining ~70% of UEs can be served only via the macro cell. The latter UEs can then make use of PDCP duplication for reliability boosting only if the macro cell splits its bandwidth in more-than-one CCs by making use of CA, as illustrated in FIG. 1.

FIG. 1 shows Release-15 (state of the art) PDCP data duplication through CA for downlink in an intra-gNB deployment. The gNB receives data packets (shown as a black box) from the core network (e.g. UPF), encapsulates them into PDCP PDUs and assigns them a sequence number (SN). If PDCP data duplication is deemed needed/requested, the gNB duplicates the packet at the PDCP layer. One duplicate (shown as a black box) is pushed down to the RLC entity that controls the first component carrier (denoted as CC1), and another duplicate (shown as a dashed box) to the RLC entity that controls the second component carrier (denoted as CC2). The same data packet (i.e., the PDCP PDU with a given SN) is then independently transmitted to the UE through both CCs. The duplicates have the same SN.

For the purpose of the present application, each cell is unambiguously related to a carrier (having a central frequency and a bandwidth around the central frequency). Since each cell is also unambiguously identified by its cell identifier, the carrier is unambiguously identified by the cell identifier, too.

The following further background and prior art concepts are relevant in the context of this application:

PDCP Duplication in 5G New Radio (NR) according to 3GPP Release-15:
  duplication allows PDCP PDUs to be duplicated and sent over two different RLC entities;
  the RLC entities can either belong to the same cell group (duplication via CA) or to different cell groups (duplication via DC);
  when the same cell group is used, restrictions in MAC are put in place to guarantee that the two duplicates never end up on the same carrier. If they did, they would fail at the same time, cancelling any benefits of duplicating packets;
  when different cell groups are used, the carrier of the first cell must be different from the carrier of the second cell, i.e. inter-frequency scenario;
  duplication is enabled at RRC and controlled at MAC by means of a MAC Control Element (CE) for the uplink direction.

In the context of NR, the concept of bandwidth part (BWP) is introduced. Simply expressed, a BWP is a sub-band within a wider NR carrier. BWP is defined in NR Rel-15 in 3GPP TS 38.300 (see Sec. 6.10), 3GPP TS 38.211 (in Sec. 4.4.5), and 3GPP TS 38.331 (see BWP Information Element—IE), while the configuration of a BWP is described in clause 12 of 3GPP TS 38.213. The definition of BWP and basic characteristics are listed below:
  A carrier bandwidth part is defined as follows (see 3GPP TS 38.211, Section 4.4.5): "A Carrier Bandwidth Part is a contiguous set of physical resource blocks, selected from a contiguous subset of the common resource blocks for a given numerology and cyclic prefix on a given carrier."
  NR Rel. 15 supports BWP sizes between 24 and 275 PRBs (400 MHz, 120 kHz SCS).
  NR supports 4 numerologies: {15, 30, 60 kHz} for SCS in FR1 (<6 GHz), and {60,120 kHz} for SCS in FR2 (>6 GHz).
  For paired spectrum (FDD), UE can be configured with an initial downlink/uplink BWP plus up to 4 downlink and up to 4 uplink BWPs in a serving cell.
  Only one carrier BWP can be active at a given time.
  The UE is not expected to transmit or receive PDSCH, PDCCH, CSI-RS, or TRS outside an active BWP. This means that the resource allocation in frequency to a UE should be within its active BWP(s) using the associated numerology.
  The bandwidth parts are indicated by a bandwidth part indicator which may comprise 1 or 2 bits:

TABLE 1

Bandwidth part indicator (BWPI), taken from 3GPP TS 38.212 v15.3.0-Table 7.3.1.1.2-1

| Value of BWP indicator field | | |
|---|---|---|
| 1 bit | 2 bits | Bandwidth part |
| 0 | 0 | First bandwidth part configured by higher layers |
| 1 | 1 | Second bandwidth part configured by higher layers |
|  | 10 | Third bandwidth part configured by higher layers |
|  | 11 | Fourth bandwidth part configured by higher layers |

In summary:

Prior art: PDCP duplication in LTE/NR requires multi-frequency layers: two instances of a PDCP packet (i.e. two duplicates) shall be sent on different serving cells operating at different frequencies:
  In single-gNB scenarios, this is achieved by CA-based duplication, i.e. the duplicates are sent via two component carriers in the same gNB (i.e. PCell@F1+SCell@F2, where F1/F2 denotes the carrier frequency, e.g. 2.1 GHz).
  In multi-gNB scenarios, this is achieved by Dual Connectivity based duplication, i.e. the duplicates are sent via two nodes operating at different frequencies (i.e. PCell@F1 on the master cell group plus PSCell@F2 on the secondary cell group).

The reason for such requirement is to avoid that two serving CCs of a UE cause interference to each other.

In the prior art, a carrier may comprise plural configured BWPs. However, in Release 15, only one BPW can be active at a time for a transmitter/receiver pair (both for downlink and uplink). One may switch between different active BWPs exploiting one of the following mechanisms:
  1. Downlink-Control Information (DCI) signaling: a configured BWP can be activated by the Bandwidth part indicator (see above) in DCI Format 0_1 (a UL Grant) and DCI Format 0_1 (a DL Schedule);
  2. Radio-Resource Control (RRC) configuration;
  3. Timer-based configuration: this timer controls an automatic switch to the default BWP. The automatic switch is inactivity-based.
  4. By the MAC entity itself upon initiation of a Random Access procedure.

An earlier patent application (PCT/EP2019/053714) proposed to simultaneously use two active BWPs to implement PDCP data duplication in the intra-gNB scenario (without CA) or in the intra-frequency inter-gNB scenario. This proposal has quite some impact on the UE complexity and on the 3GPP technical specifications.

SUMMARY OF THE INVENTION

It is an object of the present invention to improve the prior art.

According to a first aspect of the invention, there is provided an apparatus, comprising means for instructing configured to instruct a sender to transmit a first packet data unit to a receiver on a first active bandwidth part of a carrier at a first transmission time; means for determining configured to determine a delay and a second bandwidth part of the carrier based on a switching rule; wherein the switching rule defines that the second bandwidth part is different from the first bandwidth part; and the means for instructing is configured to instruct, if the sender is instructed to transmit the first packet data unit, the sender to transmit a second packet data unit to the receiver on the second active bandwidth part at a second transmission time after the delay after the instructing to transmit the first packet data unit has elapsed.

According to a second aspect of the invention, there is provided an apparatus, comprising first means for monitoring configured to monitor if a first packet data unit is received from a sender on a first active bandwidth part of a carrier at a first reception time; means for determining configured to determine a delay and a second bandwidth part of the carrier based on a switching rule; wherein the switching rule defines that the second bandwidth part is different from the first bandwidth part; and the first means for monitoring is configured to monitor, if the first packet data unit is received, if a second packet data unit is received from the sender on the second active bandwidth part at a second reception time after the delay after the first packet data unit was received has elapsed.

According to a third aspect of the invention, there is provided a method, comprising instructing a sender to transmit a first packet data unit to a receiver on a first active bandwidth part of a carrier at a first transmission time; determining a delay and a second bandwidth part of the carrier based on a switching rule; wherein the switching rule defines that the second bandwidth part is different from the first bandwidth part; and the method further comprises instructing, if the sender is instructed to transmit the first packet data unit, the sender to transmit a second packet data unit to the receiver on the second active bandwidth part at a second transmission time after the delay after the instructing to transmit the first packet data unit has elapsed.

According to a fourth aspect of the invention, there is provided a method, comprising monitoring if a first packet data unit is received from a sender on a first active bandwidth part of a carrier at a first reception time; determining a delay and a second bandwidth part of the carrier based on a switching rule; wherein the switching rule defines that the second bandwidth part is different from the first bandwidth part; and the method further comprises monitoring, if the first packet data unit is received, if a second packet data unit is received from the sender on the second active bandwidth part at a second reception time after the delay after the first packet data unit was received has elapsed.

Each of the methods of the third and fourth aspects may be methods of radio link switching.

According to a fifth aspect of the invention, there is provided a computer program product comprising a set of instructions which, when executed on an apparatus, is configured to cause the apparatus to carry out the method according to any of the third and fourth aspects.

According to some example embodiments of the invention, at least one of the following advantages may be achieved:
- reduced signalling overhead to achieve higher flexibility for exploiting the available bandwidth;
  - in particular: bandwidth splitting for PDCP duplication does not affect the available bandwidth for traffic without PDCP duplication;
  - additionally, bandwidth splitting entails inserting guard bands between the CCs, namely, at the two edge frequencies of each component carrier, to avoid cross-interference, but at the cost of unutilized parts of the carrier.
- reduced energy consumption at UE and gNB;
- transmission reliability may be enhanced.

Further advantages become apparent from the following detailed description.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred example embodiments of the present invention which is to be taken in conjunction with the appended drawings, wherein.

DETAILED DESCRIPTION OF CERTAIN EXAMPLE EMBODIMENTS

Figure 1:
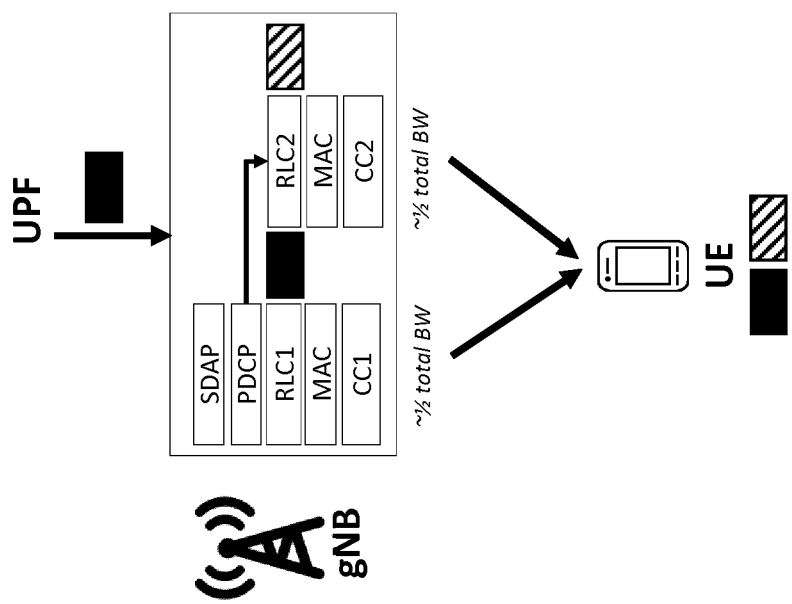
FIG. 1 shows PDCP data duplication according to 3GPP Rel-15.

Herein below, certain example embodiments of the present invention are described in detail with reference to the accompanying drawings, wherein the features of the example embodiments can be freely combined with each other unless otherwise described. However, it is to be expressly understood that the description of certain example embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Some example embodiments of the invention improve the radio resource efficiency when operating PDCP data duplication for URLLC in an intra-gNB deployment, i.e., the two (or more) transmission paths to convey the packet duplicates are instantiated at the same gNB. In PDCP duplication of Rel-15, duplication with only one carrier is not possible. According to some example embodiments of the invention, this restriction is overcome.

When PDCP data duplication is supported in the intra-gNB scenario, the adoption of CA may bring a severe limitation to the frequency deployment, because of the need of partitioning the available bandwidth in multiple chunks (i.e., the CCs). As an example, given a (small) cell having a total system bandwidth B=20 MHz, two CCs need to be deployed to operate in CA, each with, e.g., half bandwidth $B_1$ and $B_2$, such that $B_1+B_2=B$. In particular, CC1 may have center frequency $F_1$=3.495 GHz with $B_1$=10 MHz, and CC2 may have center frequency $F_2$=3.505 GHz with $B_2$=10 MHz.

Such bandwidth partitioning may lead to suboptimal system performance and end-user performance. For instance, the same (small) cell may be serving other kinds of traffic than URLLC, with heterogeneous requirements. For example, enhanced mobile broadband (eMBB) users or massive machine-type communication (mMTC) devices may require the usage of a transmission bandwidth exceeding $B_1$ or $B_2$ to receive large amounts of data for, e.g., video streaming and firmware updates, respectively. However, they cannot use the total bandwidth B without employing CA. Thus, eMBB/mMTC users may be forced to employ CA (if supported by the UE) to meet their capacity requirements, which results in a larger UE power usage due to the CA operations.

The prior art results in a severe limitation to the frequency deployment because of the need of partitioning (fragmenting) the available bandwidth in at least two chunks (i.e., the CCs) in order to operate the duplication. Such bandwidth partitioning may lead to suboptimal system performance and end-user performance for those devices that may require the usage of a transmission bandwidth exceeding the fragmented size, e.g., video streaming and firmware updates. These users may be forced to employ CA (if supported by the UE) to meet their capacity requirements, which results in a larger UE power usage and more signaling (for measurements configuration and reporting, setting up of CA), and having to rely on a slow mechanism to adjust the used CCs.

Some example embodiments of the invention realize CA within a carrier, without splitting it in component carriers, by a radio resource partitioning in "virtual" CCs according to a switching rule, which is assigned to a UE. For one UE, there may be one or more switching rules, e.g. as function of the type of service, etc. Thus, some example embodiments of the invention address the negative impact of hard radio resource partitioning of CA. The regular NR BWP (as explained in the prior art section) is assumed and used in some example embodiments of the invention but the invention is not limited to the detailed values defined for any 3GPP release.

More in detail, according to some example embodiments of the invention, both the gNB and the UE use a pre-configured rule to switch the active BWP, among the configured BWPs. In some example embodiments, the switching is used for the transmission of packet duplicates (packets duplicated at PDCP) to increase the transmission diversity.

For example, focusing on the downlink direction, the network will first schedule one instance of a packet in the currently active BWP (say, BWP1) and switch the active BWP (i.e., to BWP2) before scheduling another instance of the packet (i.e., the duplicate) to BWP2. Correspondingly, the UE switches from BWP1 to BWP2 according to the same switching rule after receipt of the first packet. The network accounts for the BWP switching delay (e.g., as defined by RAN4) when scheduling the packets/allocations. The proposed method may be applied both in uplink and downlink transmissions.

It is noted that the pre-configured switching of the active BWP has the aim of minimizing the signaling overhead and avoiding signaling misdetection which would be deleterious for the latency/reliability targets of e.g. URLLC and/or TSN traffic.

In addition, semi-persistent radio resources (semi-persistent scheduling (SPS) in DL and configured grant (CG) in UL) are allocated to the UE on the different BWPs which may be used according to the pre-configured switch of the BWPs.

The pre-configured BWP switching according to some embodiments of the invention may be used for the transmission of a packet and its (directly) subsequent packet of a stream of packets in order to boost transmit diversity of subsequent transmissions. That is, the packets are not duplicates. Thus, one may account for the survival time, i.e., the maximum number of subsequent errors that can be tolerated by an application.

Some methods according to some example embodiments of the invention are applicable preferably to applications that have a more relaxed latency requirement than the BWP switching delay.

Figure 3:
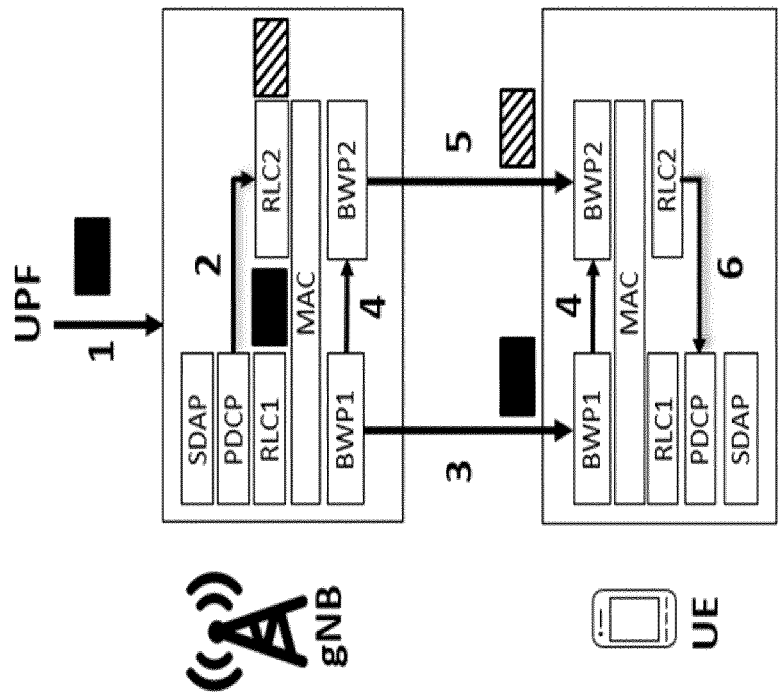
FIG. 3 shows a concept of PDCP data duplication in downlink according to some example embodiments of the invention.
Figure 2:
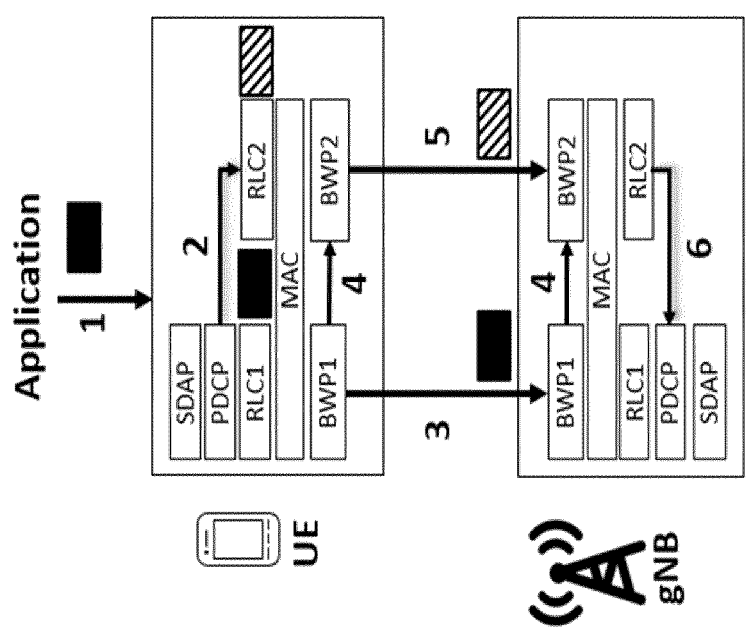
FIG. 2 shows a concept of PDCP data duplication in uplink according to some example embodiments of the invention.

FIG. 2 illustrates the schematic of some embodiments of the invention for the uplink case. FIG. 3 illustrates the schematic of some embodiments of the invention for the downlink case. In both cases, the transmitting entity (sender, i.e.: UE in FIG. 2, and gNB in FIG. 3) implements PDCP data duplication through BWP aggregation. That is, according to FIG. 2, the PDCP layer of the UE receives a packet (black box) from an application and duplicates it (black box and hashed box). According to FIG. 3, the PDCP layer of the gNB receives a packet (black box) from the core network (e.g. UPF) and duplicates it (black box and hashed box). The respective sender transmits the first duplicate on BWP1 and the second duplicate on BWP2. The packet transmissions on the two BWPs take place at subsequent times (directly subsequent times), which are pre-configured on both UE and gNB by the network. Thus, the respective receiver receives the duplicates on the respective BWPs.

The numbers on the arrows in FIGS. 2 and 3 indicate the sequence of the actions carried out at both transmission ends (sender, receiver).

1. A packet arrives at the upper layer of the sender and is passed to the PDCP layer.
2. The PDCP layer of the sender duplicates the packet.
3. The first duplicate is transmitted on BWP1 at time t over the associated radio resources (e.g. CG or SPS) and the receiver receives them on BWP1 and attempts decoding it.
4. Both sender and receiver switch the active BWP from BWP1 to BWP2 according to the switching rule.
5. The second duplicate is transmitted on BWP2 at time t+Δ, where Δ is the minimum BWP switching delay or another delay period longer than the BWP switching delay. The receiver attempts decoding the signal received on BWP2.
6. The PDCP layer of the receiver entity receives the duplicates and operates as in the legacy procedures. For example, the PDCP layer may discard one of the duplicates (typically the later received one (i.e. the one received on BWP2)), or combine the two duplicates.

Hereinafter, an example embodiment of the invention related to an uplink transmission is explained at greater detail. In this use case, a reliable uplink transmission of packets from a UE to a cell, represented by a gNB, is required. In order to maximize the transmit diversity, PDCP data duplication is enabled exploiting distinct BWPs (instead of distinct CCs, as in legacy duplication via CA) which are sequentially activated according to a switching rule, as a means of increasing the network flexibility and efficiency.

The UE has up to N (e.g., 4 in Rel-15) configured BWPs that can potentially be activated, with the restriction that only one BWP may be active at a time. In the present example, two BWPs (BWP1 and BWP2) are configured. The network activates/configures PDCP data duplication at the UE side, provides an indication of the BWP (e.g., BWP1) to associate with the logical channel (LCH) corresponding to the first instance of a packet (e.g., LCH1) and of the BWP (e.g., BWP2) to associate with the LCH (e.g., LCH2) corresponding to the second instance of the packet. The configuration further indicates that BWP1 and BWP2 are mapped to the RLC entities associated to the PDCP entity for which PDCP data duplication was configured.

A configured grant (CG) configuration could be also associated with a given BWP and LCH. As a consequence, the timing of the CG activation must follow the BWP switch pattern. In particular, we denote with CG1 the configuration tailored to LCH1, which is defined by the transmission timing comprising, e.g., an offset o1 and a periodicity p1. We denote with CG2 the configuration tailored to LCH2 (for duplicated packets), which is defined by the transmission timing comprising, e.g., an offset o1+Δ (with Δ being the minimum BWP switching delay or a longer predefined delay) and periodicity p1 (same as for CG1).

Figure 4:
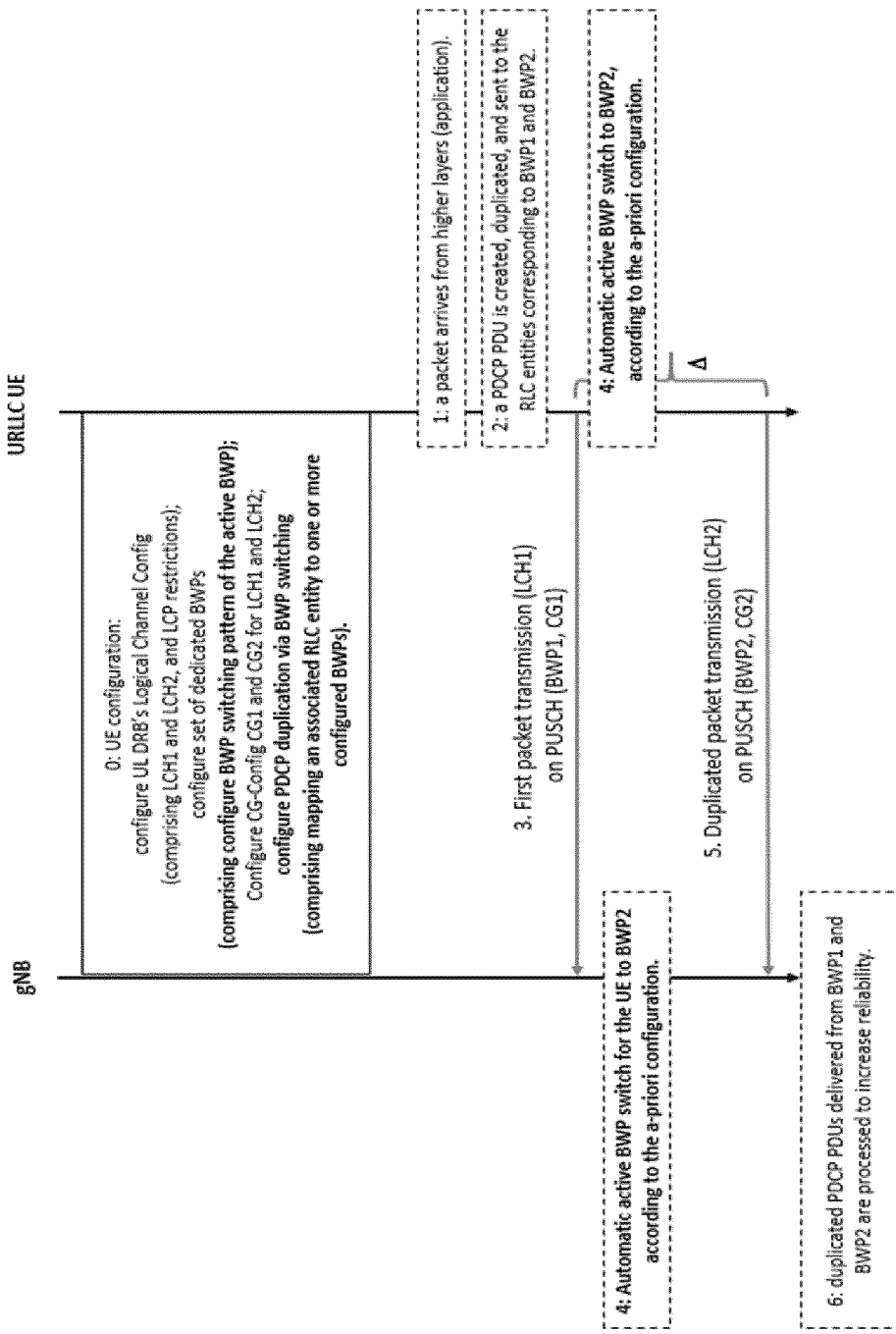
FIG. 4 shows a flowchart according to an example embodiment of the invention.

A flowchart the method according to this use case is provided in FIG. 4. As shown in FIG. 4, as action "0", the network represented by gNB configures the UE (here, a URLLC UE is shown as an example but the method of FIG. 4 is not limited to URLLC UEs). In particular, the network configures the LCHs and respective BWPs, and provides a switching rule to the UE to be used for transmission of PDCP duplicated packets.

The actions of numerals 1 to 6 correspond to numerals 1 to 6 of FIG. 2 and reference is made to the description of FIG. 2.

In some example embodiments of the invention, in order to reduce the overall signaling overhead, the BWP switching rule is provided by the network to the UE in a semi-static fashion, e.g., as part of the aforementioned BWP configuration, via RRC/MAC CE. However, regardless how the UE obtains the BWP switching rule, the UE will autonomously switch between the BWPs as instructed for the transmission of the corresponding LCHs. The pre-configured BWP switching rule avoids the transmission of dedicated signaling to indicate each single BWP switch.

In one example embodiment, the BWP switching pattern is defined by the absolute timing of the switch and the BWPs to be switched at a given time as exemplified in the examples below.

Example 1 is related to PDCP duplication with two BWPs.

The BWP switching rule is configured as follows:
Switch from BWP1 to BWP2 is instructed after $t0+2n\times p1$
Switch from BWP2 to BWP1 is instructed after $t0+(2n+1)\times p1$ where
$t0$ is the starting time of the first transmission for LCH1
$p1$ is the periodicity of CG1
$n$ is an integer ranging from 0, 1, 2, . . . .
This switching rule leads to:
Pkt #1 (LCH1)=>TXM at t0 on BWP1; CG1 (offset o1, periodicity p1)
=>BWP switch from BWP1 to BWP2 after t0
Pkt #1' (LCH2)=>TXM at t0+Δ on BWP2; CG2 (offset o1+Δ, periodicity p1)
Pkt #2 (LCH1)=>TXM at t0+p1 on BWP2; CG1 (offset o1, periodicity p1)
=>BWP switch from BWP2 to BWP1 after t0+p1
Pkt #2' (LCH2)=>TXM at t0+p1+Δ on BWP1; CG2 (offset o1+Δ, periodicity p1)
Pkt #3 (LCH1)=>TXM at t0+2p1 on BWP1; CG1 (offset o1, periodicity p1)=>BWP switch from BWP1 to BWP2 after t0+2p1
Pkt #3' (LCH2)=>TXM at t0+2p1+Δ on BWP2; CG2 (offset o1+Δ, periodicity p1)
Etc . . . .

In this example, the switching delay Δ is shorter than the periodicity p1.

Example 2 is related to transmitting subsequent packets with 4 BWPs to meet survival time target.

The BWP switch rule is configured as follows:
Switch from BWP1 to BWP2 is instructed after $t0+4n\times p1$
Switch from BWP2 to BWP3 is instructed after $t0+(4n+1)\times p1$
Switch from BWP3 to BWP4 is instructed after $t0+(4n+2)\times p1$
Switch from BWP4 to BWP1 is instructed after $t0+(4n+3)\times p1$ where
$p1$ is the periodicity of CG1
$n$ is an integer ranging from 0, 1, 2, . . .
This switching rule leads to:
Pkt #1 (LCH1)=>TXM at t0 on BWP1; CG1 (offset o1, periodicity p1)
=>BWP switch from BWP1 to BWP2 after t0
Pkt #2 (LCH1)=>TXM at t0+p1 on BWP2; CG1 (offset o1, periodicity p1)
=>BWP switch from BWP2 to BWP3 after t0+p1
Pkt #3 (LCH1)=>TXM at t0+2p1 on BWP3; CG1 (offset o1, periodicity p1)
=>BWP switch from BWP3 to BWP4 after t0+2p1
Pkt #4 (LCH1)=>TXM at t0+3p1 on BWP4; CG1 (offset o1, periodicity p1)
=>BWP switch from BWP4 to BWP1 after t0+3p1
Pkt #5 (LCH1)=>TXM at t0+4p1 on BWP1; CG1 (offset o1, periodicity p1)
=>BWP switch from BWP1 to BWP2 after t0+4p1
Etc . . . .

As function of traffic periodicity, the timing of the BWP switching may be optimized further to accommodate that potential HARQ retransmissions can occur in the same BWP, i.e. before the switch to a different BWP.

In another example, the PDCP entity can provide a switch indication to the PHY layer based on the packet duplication.

According to some example embodiments of the invention, a single cell may realize PDCP duplication without the need to partition its bandwidth in multiple CCs (i.e., without CA), and rather by exploiting the sequential activation of distinct BWPs. In this way, the gNB is allowed to serve delay-tolerant downlink traffic exploiting the maximum scheduling flexibility, since the entire pool of downlink radio resources is available. On the other hand, e.g. for URLLC downlink transmissions, the gNB can exploit the frequency diversity allocating multiple active BWPs, which represent virtual component carriers, for the transmission of duplicates.

Some example embodiments of the invention address the overhead of active-BWP switching, proposing a pre-configured switching between active BWPs for a given transmitter/receiver pair in order to reduce the overall signalling overhead.

Coexistence Between Regular Operations and PDCP Duplication Through Virtual-CCs

In the following, the gNB operations comprising the scheduling operations for the coexistence of URLLC (as an example of BWP switching) and eMBB/mMTC (as examples without BWP switching) UEs are described.

The assignment of the active BWPs for the various UEs is done as function e.g. of their applications (or the QoS required by the applications). Also, the quality of the active BWPs (e.g. radio signal strength/quality, SINR, achievable BLER, etc.) may be taken into account.

For instance, out of the dedicated BWPs, the gNB will assign:
  one larger active BWP whose size is up to the entire available bandwidth for delay-tolerant downlink traffic (e.g., eMBB and mMTC),
  two or more active BWPs (vCCs) to URLLC UEs, who benefit from data duplication.

During the scheduling operations, where frequency resources (PRBs) have to be assigned to a UE, the MAC scheduler will apply appropriate masks certain BWPs when scheduling a UE, accounting for a UE's active BWP(s) and their potential restrictions.

In this way, the gNB has the maximum flexibility in scheduling downlink traffic for delay-tolerant applications (background traffic) on the entire pool of radio resources, so that the background traffic achieves the maximum system capacity. This target may be achieved by defining a single active BWP (with a bandwidth equal to e.g. the entire transmission bandwidth) for UEs requiring broadband downlink traffic at less-stringent delay requirements. On the other hand, upon scheduling URLLC downlink transmissions, the gNB is allowed to define distinct transmission paths via the vCCs (BWP1 and BWP2) that exploit the frequency diversity to improve the transmission reliability.

Note that two independent transmissions using (e.g.) half of the bandwidth (N/2) can bring benefit over one unique transmission using (e.g.) full bandwidth for the following scenarios and reasons:
  As duplication will be used for URLLC applications, which typically have small payload size (e.g. 20 B), half of the bandwidth may be sufficient to operate at the lowest MCS the standard allows (e.g. QPSK 1/8) in most of the cases. Therefore, having more bandwidth can only afford using additional coding means, such as padding, which are rather inefficient. Note that typically coding becomes inefficient at the lowest coding rate.
  The supported bandwidth of the UE may be much smaller than the system bandwidth of the serving cell, and therefore the UE cannot benefit from a larger bandwidth without fragmenting the spectrum in component carriers—unless some example embodiments of this invention are used. Especially in millimeter waves scenarios, the available spectrum is rather large (e.g. several hundreds of MHz) and from a complexity point of view, it is simpler for a UE to have 4 receivers operating e.g. at a maximum BW of 100 MHz rather than having one receiver operating at 400 MHz. Note that the mmW scenarios are currently considered as promising in the Rel-16 URLLC SI (see 3GPP R1-1900976 or 3GPP R1-1900171).

Also, the two major sources of packet errors are errors in link adaptation (i.e. the estimated MCS was wrong) and interference (the SINR at the time of transmission degraded because of interference). By having two independent transmissions we can achieve more diversity in respect of both errors as compared to have one unique transmission. Details of combining the received PDUs on the UE side are explained e.g. in PCT/FI2018/050918. The method proposes a light coordinated transmission at the two nodes/component carriers of a PDCP PDU and its duplicate and their combining at the receiver side, where the combining is applied at PHY by soft information combining of the TBs carrying the original and duplicated PDCP PDU.

In some example embodiments, UE considers only the first received PDU of the multiplied (duplicated) PDU, and discards the later received duplicates. Thus, latency may be reduced.

Additionally, for the two independent transmissions, their MCS can be optimized separately, whereas the MCS level of the unique transmission will be suboptimal, since the effective SINR over the entire transmission bandwidth (which determines the actual MCS) may degrade. I.e. the PRBs with lower SINR will negatively impact the effective SINR computed via EESM.

Figure 5:
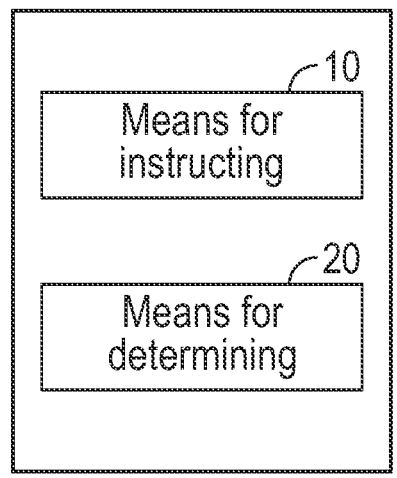
FIG. 5 shows an apparatus according to an example embodiment of the invention.
Figure 6:
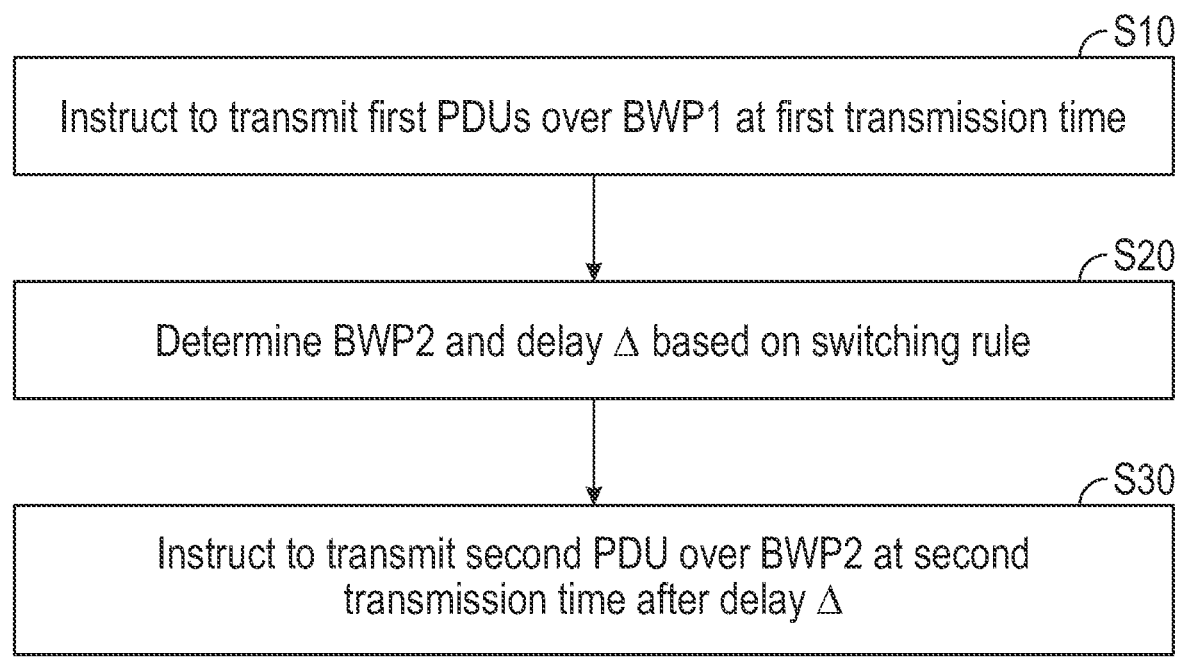
FIG. 6 shows a method according to an example embodiment of the invention.

FIG. 5 shows an apparatus according to an example embodiment of the invention. The apparatus may be a sender (e.g. gNB or UE) or an element thereof. In particular, it may be a base station in downlink communication or a terminal in uplink communication. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for instructing 10 and means for determining 20. The means for instructing 10 and means for determining 20 may be an instructing means and determining means, respectively. The means for instructing 10 and means for determining 20 may be an instructor and determiner, respectively. The means for instructing 10 and means for determining 20 may be an instructing processor and determining processor, respectively.

The means for instructing 10 instructs a sender to transmit a first packet data unit to a receiver on a first active bandwidth part of a carrier at a first transmission time (S10).

The means for determining 20 determines a delay and a second bandwidth part of the carrier based on a switching rule (S20). The switching rule defines that the second bandwidth part is different from the first bandwidth part.

S10 and S20 may be performed in an arbitrary sequence. S10 and S20 may be performed fully or partly in parallel.

If the sender is instructed to transmit the first packet data unit (S10), the means for instructing 10 instructs the sender to transmit a second packet data unit to the receiver on the second active bandwidth part at a second transmission time (S30). In particular, the means for instructing instructs the sender to transmit the second packet data unit after the determined delay after the instructing to transmit the first packet data unit (S10) has elapsed. For example, the means for instructing 10 may instruct the sender to transmit the second packet data unit immediately after instructing to transmit the first packet data unit, indicating the applicable delay. As another example, the means for instructing 10 may instruct the sender to transmit the second packet data unit only after the delay after the instructing to transmit the first packet data unit has elapsed. In this case, the instructing to transmit may mean instructing to transmit immediately (as soon as possible). The switching rule may additionally comprise a maximum time duration during which the transmission of the second packet data unit may be performed after the delay has elapsed.

Figure 7:
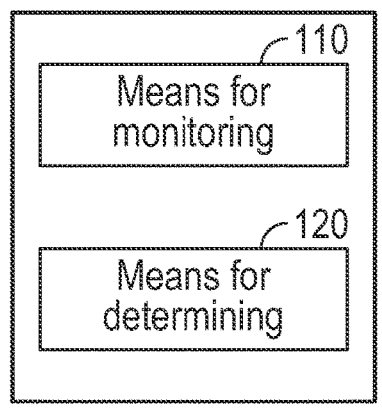
FIG. 7 shows an apparatus according to an example embodiment of the invention.
Figure 8A:
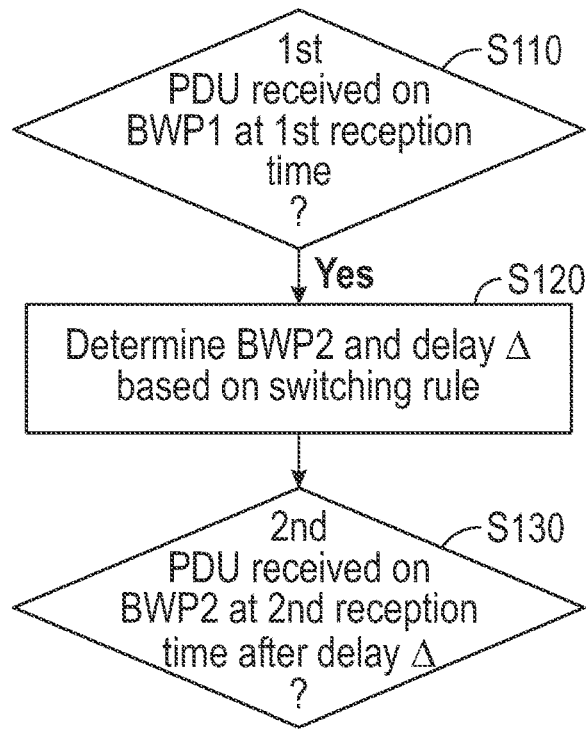
FIG. 8a shows a method according to an example embodiment of the invention.
Figure 8B:
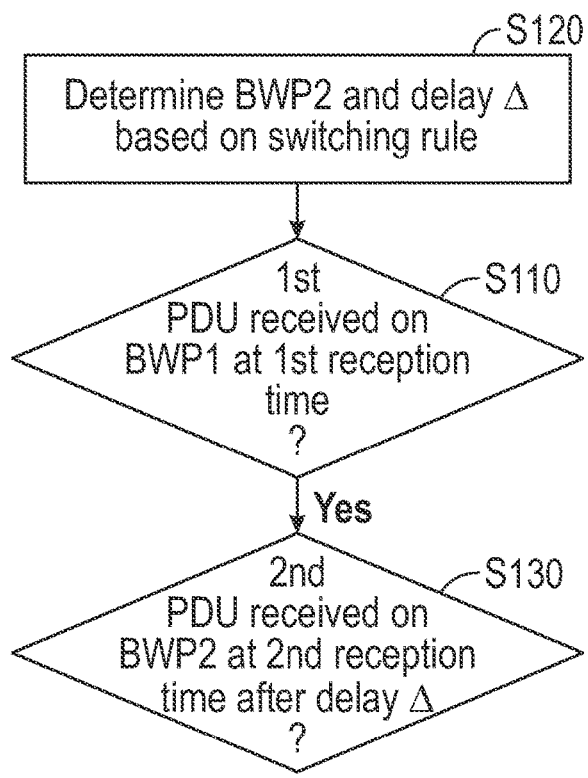
FIG. 8b shows a method according to an example embodiment of the invention.

FIG. 7 shows an apparatus according to an example embodiment of the invention. The apparatus may be a sender (e.g. gNB or UE) or an element thereof. In particular, it may be a base station in uplink communication or a terminal in downlink communication. FIGS. 8a and 8b show methods according to an example embodiment of the invention. The apparatus according to FIG. 7 may perform the methods of FIGS. 8a and 8b but is not limited to these methods. The methods of FIGS. 8a and 8b may be performed by the apparatus of FIG. 7 but are not limited to being performed by this apparatus.

The apparatus comprises means for monitoring 110 and means for determining 120. The means for monitoring 110 and means for determining 120 may be a monitoring means and determining means, respectively. The means for monitoring 110 and means for determining 120 may be a monitor and determiner, respectively. The means for monitoring 110 and means for determining 120 may be a monitoring processor and determining processor, respectively.

The means for monitoring 110 monitors if a first packet data unit is received from a sender on a first active bandwidth part of a carrier at a first reception time (S110).

The means for determining 120 determines a delay and a second bandwidth part of the carrier based on a switching rule (S120). The switching rule defines that the second bandwidth part is different from the first bandwidth part.

S110 and S120 may be performed in an arbitrary sequence. S110 and S120 may be performed fully or partly in parallel. If S120 is performed after S110, it may be performed only if the first PDU is received (S110=yes), or it may be performed in any case, regardless of whether or not the first PDU is received. Different examples are shown in FIGS. 8a and 8b.

If the first packet data unit is received (S110=yes), the means for monitoring 110 monitors if a second packet data unit is received from the sender on the second active bandwidth part at a second reception time (S130). In particular, the means for monitoring 110 monitors if the second packet data unit is received after the delay after the first packet data unit was received (S110) has elapsed. For example, the means for monitoring 10 may start monitoring if the second packet data unit is received immediately after receipt of the first packet data unit and evaluate the delay later on. As another example, the means for monitoring 110 may monitor if the second packet data unit is received only after the delay after the receipt of the first packet data unit has elapsed. The switching rule may additionally comprise a maximum time duration during which the receipt of the second packet data unit is to be expected after the delay has elapsed.

Figure 9:
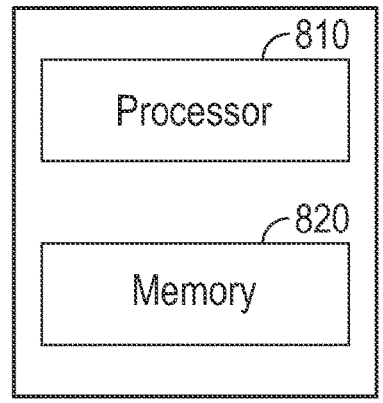
FIG. 9 shows an apparatus according to an example embodiment of the invention.

FIG. 9 shows an apparatus according to an example embodiment of the invention. The apparatus comprises at least one processor 810 and at least one memory 820 including computer program code, and the at least one processor 810, with the at least one memory 820 and the computer program code, being arranged to cause the apparatus to at least perform at least one of the methods according to FIGS. 6, 8a, and 8b and related description.

Some example embodiments of the invention are described which are based on a 3GPP network (e.g. NR). However, the invention is not limited to NR. It may be applied to any generation (3G, 4G, 5G, etc.) of 3GPP networks.

Some example embodiments of the invention are described in detail for an uplink transmission. However, some example embodiments of the invention are applicable to the downlink where the cell transmits on two or more active bandwidth parts according to a switching rule.

In some example embodiments of the invention, the network provides the applicable switching rule to the UE before the BWP switching is applied. In other example embodiments, a set of switching rules is available at the UE and the network provides an indication of the applicable switching rule out of the set of switching rules. The set of switching rules may be preconfigured in the UE, or the network may provide the set of switching rules to the UE.

In some example embodiments, a single switching rule is defined in both the network and the UE. In some example embodiments, plural switching rules are defined in both network and UE, and the applicable switching rule is defined autonomously by each of network (gNB) and UE based on some condition, such as a higher layer application for which the BWP switching is to be applied or the time of the day. In these embodiments, network need not to inform the UE on the applicable switching rule.

A UE is an example of a terminal. However, the terminal (UE) may be any device capable to connect to the (3GPP) radio network such as a MTC device, a IoT device etc.

The cell may be a part of a base station. A base station may comprise one or more cells. A base station may be e.g. a gNB, eNB, or a NodeB. As outlined hereinabove, a cell (and its carrier) is identified by its cell identifier. However, the transmission chain of the cell (e.g. gNB) is not limited to a specific implementation. For example, it may comprise Remote Radio Head(s), antenna panel(s)/element(s), TRP(s) (transmission and reception points). Each Radio unit is connected to antenna(s) serving a particular direction, and thus forming a cell.

The definitions indicated in the present description are based on the current 3GPP standards. However, they do not limit the invention. Other definitions according to the same or a corresponding concept are applicable to some example embodiments of the invention, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

According to the above description, it should thus be apparent that example embodiments of the present invention provide, for example, a terminal (such as a UE), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a satellite acting as a base station (e.g. gNB or eNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. An apparatus, comprising:
at least one processor; and
at least one memory including computer program code, the at least one memory and computer program code being configured, with the at least one processor, to cause the apparatus to perform:
first monitoring if a first packet data unit is received from a sender on a first active bandwidth part of a carrier at a first reception time;
determining a delay and a second bandwidth part of the carrier based on a switching rule; wherein
the switching rule defines that the second bandwidth part is different from the first bandwidth part; and
the first monitoring is configured to monitor, if the first packet data unit is received, if a second packet data unit is received from the sender on the second active bandwidth part at a second reception time after the delay after the first packet data unit was received has elapsed; wherein
the first packet data unit has a first sequence number;
the second packet data unit has a second sequence number; and wherein the at least one memory and computer program code are further configured, with the at least one processor, to cause the apparatus to perform first checking if the first sequence number is the same as the second sequence number; and
handling the second packet data unit as a duplicate of the first packet data unit if the first sequence number is the same as the second sequence number; and
wherein the at least one memory and computer program code are further configured, with the at least one processor, to cause the apparatus to perform supervising if an information is received that the sender duplicates a received packet data unit into the first packet data unit and the second packet data unit; and inhibiting the first checking from checking if the information is not received.

2. The apparatus according to claim 1, wherein the at least one memory and computer program code are further configured, with the at least one processor, to cause the apparatus to perform informing the sender on the switching rule.

3. The apparatus according to claim 1, wherein the sender comprises a terminal, and the receiver comprises a cell.

4. The apparatus according to claim 1, wherein the at least one memory and computer program code are further configured, with the at least one processor, to cause the apparatus to perform second monitoring if a message comprising the switching rule is received from the sender;
deriving the switching rule from the message if the message is received.

5. The apparatus according to claim 1, wherein the sender comprises a cell, and the receiver comprises a terminal.

6. The apparatus according to claim 1, wherein the receiver comprises a terminal, and wherein the sender receives the received packet from an application on the terminal.

7. The apparatus according to claim 1, wherein the sender receives the received packet from a core network.

8. The apparatus according to claim 1, wherein
the first packet data unit has a first sequence number;
the second packet data unit has a second sequence number; and wherein the at least one memory and computer program code are further configured, with the at least one processor, to cause the apparatus to perform second checking if the second sequence number is subsequent to the first sequence number;
arranging the second packet data unit subsequent to the first packet data unit in a stream of packet data units if the second sequence number is subsequent to the first sequence number.

9. The apparatus according to claim 1, wherein the first monitoring is configured to monitor, if the first packet data unit is received within a predefined time duration after the delay after the first packet data unit was received has elapsed, if the second packet data unit is received.

* * * * *